United States Patent
Trott et al.

(10) Patent No.: US 8,065,216 B2
(45) Date of Patent: Nov. 22, 2011

(54) PERSONAL POINT OF SALE COMMISSION RATE BENCHMARKING TOOL

(75) Inventors: Douglas Trott, Creemore (CA); Lisa Bean, Toronto (CA); Cory Weech, Burlington (CA); Jamie Loughery, Newmarket (CA); Jeffrey Marsden, Toronto (CA); Patrick Kennedy, Toronto (CA); Milen Kovachev, Etobicoke (CA)

(73) Assignee: Pricemetrix Inc., Toronto, Ontario (CA)

( * ) Notice: Subject to any disclaimer, the term of this patent is extended or adjusted under 35 U.S.C. 154(b) by 428 days.

(21) Appl. No.: 12/359,277

(22) Filed: Jan. 23, 2009

(65) Prior Publication Data

US 2010/0191666 A1    Jul. 29, 2010

(51) Int. Cl.
*G06Q 40/00*    (2006.01)

(52) U.S. Cl. .......... 705/36 R; 705/2; 705/5; 705/14.51; 705/22; 705/34; 705/35; 705/37; 705/38; 705/80; 700/90; 700/99; 345/173; 706/59; 715/764

(58) Field of Classification Search .............. 705/35–38, 705/2, 34, 225, 14.51, 80; 700/90, 99; 345/173; 706/59; 715/764
See application file for complete search history.

(56) References Cited

U.S. PATENT DOCUMENTS

| | | | |
|---|---|---|---|
| 6,782,093 B2 | 8/2004 | Uckun | |
| 6,882,985 B1 * | 4/2005 | Kay et al. ........................ | 705/37 |
| 6,990,236 B2 | 1/2006 | Boettcher | |
| 6,995,768 B2 | 2/2006 | Jou et al. | |
| 7,203,655 B2 | 4/2007 | Herbert et al. | |
| 7,389,276 B1 | 6/2008 | Barnard et al. | |
| 7,412,402 B2 | 8/2008 | Cooper | |
| 7,707,097 B1 * | 4/2010 | Weiss et al. ..................... | 705/37 |
| 2004/0010452 A1 * | 1/2004 | LaCour .......................... | 705/26 |
| 2007/0156570 A1 * | 7/2007 | Singer et al. ................... | 705/37 |
| 2007/0179876 A1 * | 8/2007 | Stark .............................. | 705/35 |
| 2008/0015974 A1 * | 1/2008 | Balabon ......................... | 705/37 |
| 2008/0189634 A1 * | 8/2008 | Tevanian et al. .............. | 715/764 |
| 2008/0249924 A1 * | 10/2008 | Chiulli et al. ................. | 705/37 |
| 2008/0281678 A1 | 11/2008 | Keuls et al. | |
| 2009/0164250 A1 * | 6/2009 | Hamilton et al. ............. | 705/3 |
| 2009/0327109 A1 * | 12/2009 | Nordstrom et al. ........... | 705/32 |
| 2010/0169228 A1 * | 7/2010 | Rothley et al. ................ | 705/80 |

OTHER PUBLICATIONS

Numerical Linear Algebra; Lloyd N. Trefethan and David Bau, III; Siam Society for Industrial and Applied Mathematics, Philadelphia; 1997.*

* cited by examiner

*Primary Examiner* — Harish T Dass

(74) *Attorney, Agent, or Firm* — Locke Lord LLP

(57) ABSTRACT

The invention provides a method of displaying an evaluation tool for evaluating a proposed commission on behalf of a professional at the time of carrying out a transaction. Using a principal and share/unit price for the proposed transaction, the method identifies nearest neighbour historical transactions. A graph is displayed showing the professional's proposed commission in relation to these nearest neighbour historical transactions. The professional can modify the proposed commission in light of the historical data before executing the transaction and charging the commission.

22 Claims, 10 Drawing Sheets

Commission Details

| | |
|---|---|
| Exchange | 2 |
| Max Commission | 99,999,999,999.99 |
| Schedule | 17 |
| Principal | 2,200.00 |
| Commission | |
| Postage | 5.50 |
| Net Amount | 2,205.50 |

FIG.4B

PERSONAL POINT OF SALE COMMISSION RATE BENCHMARKING TOOL

FIELD OF THE INVENTION

The invention relates to commission-setting methods, and more particularly relates to methods of informing professionals to allow them to better set their own commissions.

BACKGROUND OF THE INVENTION

In many industries, when a professional provides a transactional service for a client (such as executing a trade in the securities industry), the professional has discretion over the price (i.e. the professional's fee or commission) charged to the client for the service. Ultimately, the price charged by the professional must be within the market-acceptable boundaries, or clients will go elsewhere. However, if the price charged is too low, the professional may have a high volume of business, but, in fact, not be earning the maximum amount of revenue available to them.

While the discretion over pricing allows professionals much freedom to reward client loyalty, or encourage new business or more desirable business, many salespeople and sales force managers with such discretion find it a source of difficulty and frustration. In practice, many professionals do not have a reliable sense of how they themselves price transactions and are uninformed as to the actual pricing behavior of their competitors. In some industries or firms there are "benchmarks" that are commonly used by professionals (with some tinkering to account for differences between their clients, the types of assets being transacted and the types of transactions). However, the benchmarks are often out of step with market realities. Ideally, a professional should be able to charge a client "what the market will bear" but this is difficult without accurate and up-to-date information on the state of the market. There is also pressure on professionals in certain industries or particular firms to maximize revenue by charging higher prices. However, with little reliable guidance, it is difficult for a professional to know how to adopt a pricing strategy that is competitive and revenue-maximizing, without losing touch with his own client, asset and transactional variables.

Such transaction pricing information has started to become available. Professionals can now use reports of their past pricing behavior and evaluate their pricing against prices charged by their peers (e.g. U.S. Pat. No. 7,028,006) or against reference prices based on historical data (e.g. US Published Patent Application No. 2008/0097886 A1). However, it would be desirable to make comparison data available in a simple visual format at the time it is most needed by the professional—when preparing a transaction for execution, and determining his commission. This would further allow the professional to change the commission in light of the specifics of the transaction and comparison data with similar historical transactions before executing the transaction (committing to the commission).

SUMMARY OF THE INVENTION

The invention provides a method of displaying an evaluation tool for evaluating a proposed commission on behalf of a professional at the time of carrying out a transaction. On a first computer, a principal and a share/unit price for a proposed transaction are entered, together with a proposed commission for the proposed transaction. A second computer uses a processor to identify and rank a plurality of nearest neighbour historical transactions from a historical transactions database stored at the second computer based on the principal and the share/unit price of the proposed transaction. Each historical transaction is associated with a historical commission. The second computer finds the highest and lowest historical commission among the plurality of nearest neighbour historical transactions. This information is communicated to the first computer. A display graph is generated on the first computer showing the range of historical commissions from lowest to highest. The proposed commission is displayed on the graph to allow the professional to evaluate the proposed commission relative to the nearest neighbor historical commissions. The professional can change the proposed commission (by input on the first computer) before the proposed transaction is finalized or executed. Once finalized, the commission (and the other transaction parameters) may be pre-populated into an order entry form to allow the commission to be charged. Alternatively, the data entered and calculated may become part of the order entry in process.

The display graph may further include an indication of a top percentile of the range of commissions. If the proposed commission is below the top percentile, the difference between the top percentile and the proposed commission may also be calculated and displayed.

A scheduled commission (i.e. list price) based on the principal and share/unit price of the proposed transaction may also be calculated and displayed on the graph. If the proposed commission is below the scheduled commission, the difference between the scheduled commission and the proposed commission may also be calculated and displayed.

A fixed low value commission (i.e. a pre-determined low value commission) based on the principal and share/unit price of the proposed transaction may also be calculated or retrieved and displayed on the graph. The fixed low value commission may be displayed as the bottom (or minimum) end of the graph. This may represent a discount brokerage commission rate, for instance, or some other arbitrary low benchmark. An alert may be displayed if the proposed commission is below the fixed low value commission.

The graph may be formatted in various ways. For example, a simple bar gauge may be used, or a dial gauge. For ease of comprehension, the top percentile (i.e. target zone) may be displayed in a different color from the remainder of the graph. The graph may be interactive. For example, the proposed commission indicator may be able to be repositioned by dragging to a new location on the graph to automatically change the amount.

To identify and rank a plurality of nearest neighbour historical transactions, the method preferably includes the steps of:

plotting the historical transactions on a grid having axes for principal and share/unit price;

plotting the proposed transaction on the grid based on its principal and share/unit price;

picking selected historical transactions from the grid and calculating the Euclidean distance from the proposed transaction to the historical transactions; and selecting a subset of the historical transactions having the smallest Euclidean distance as the nearest neighbor historical transactions.

In order to pick selected historical transactions from the grid, for example to improve processing efficiency, the system may choose historical transactions from stepwise bands of transactions near the proposed transaction.

Preferably, the subset of historical transactions has a preselected number of nearest neighbor historical transactions.

That is, each subset may be limited to some minimum or maximum number of transactions for smoother processing.

The historical transactions database may have historical transactions from a single firm, or a plurality of firms. The transactions may be pre-segmented by currency. The transactions may be pre-segmented by time period. The transactions may be pre-segmented by particular asset class or type of transaction or type of account or in the case of bonds, 'maturity date'.

BRIEF DESCRIPTION OF THE FIGURES

FIGS. 4A-4C depict a screen shot diagram of the calculator web application showing the input and display with a first set of sample data.

DETAILED DESCRIPTION

The invention relates to a method of computer assisted modeling for use in evaluating a proposed commission. The computer system uses a display to show a professional where his proposed commission sits relative to a range of historical commissions charged for similar transactions. This display application is described as a "calculator" or "calculator application" in the present description.

Figure 2A:
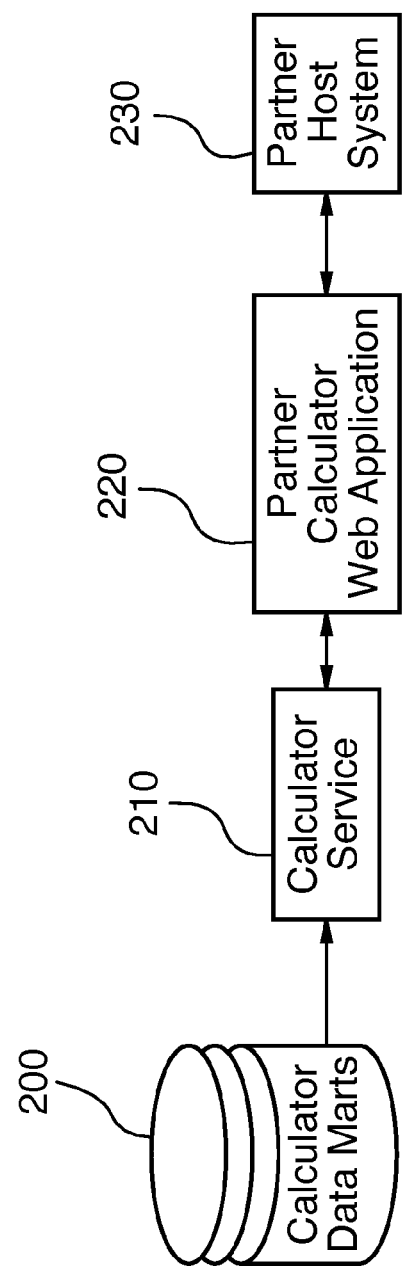
FIG. 2A is a diagram of one possible architecture of the calculator as a hosted web application together with hosted data mart(s).
Figure 2B:
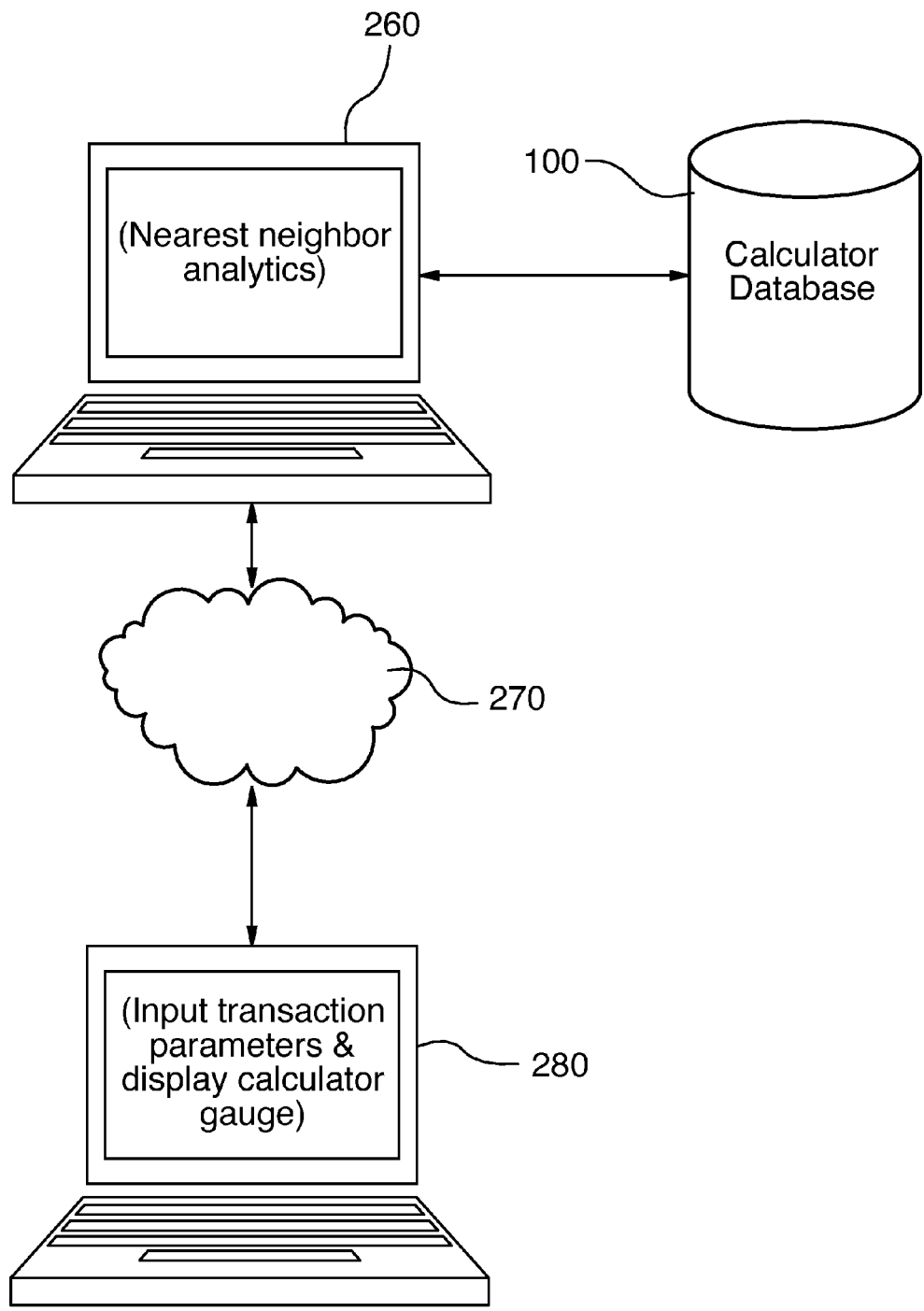
FIG. 2B is a simplified network diagram of the system.

The architecture of the system, in its simplest form, is shown in FIG. 2b. The display is generated on a first computer 280, which receives inputs from the professional of a volume and security price of a proposed transaction. (In some cases the security price is not entered by the professional, e.g. if they enter a 'market order' to buy at whatever the market price is at the time, the order entry system will automatically populate this field.) A second computer 260 finds historical commissions charged for similar transactions having reference to a database (or multiple databases) of historical transactions 100. The second computer 260 accesses this database(s) and performs "nearest neighbor" analysis to feed relevant data to the first computer for display to the professional. The connection 270 between the first 280 and second 260 computers may be an Internet connection, or any other network connection.

One possible architecture of the calculator as a hosted web application is shown in FIG. 2a. The calculator service 210 is a middle tier that serves web application 220 to users. The calculator service 210 accesses a pre-segmented data mart(s) 200, specifically customized for the particular partner. System 230 is a host system of the front end (e.g. trade order entry or transaction processing system) operated by the hosting firm (this could be the user's employer or a third party that provides the order entry technology).

The calculator application can, for example, appear as a separate window or a portion of a window on a client's trading system. In this way, data entered for a proposed transaction can be used by the calculator application at the time the transaction is being structured (before it is executed and before the professional's discretionary commission is processed).

Figure 1:
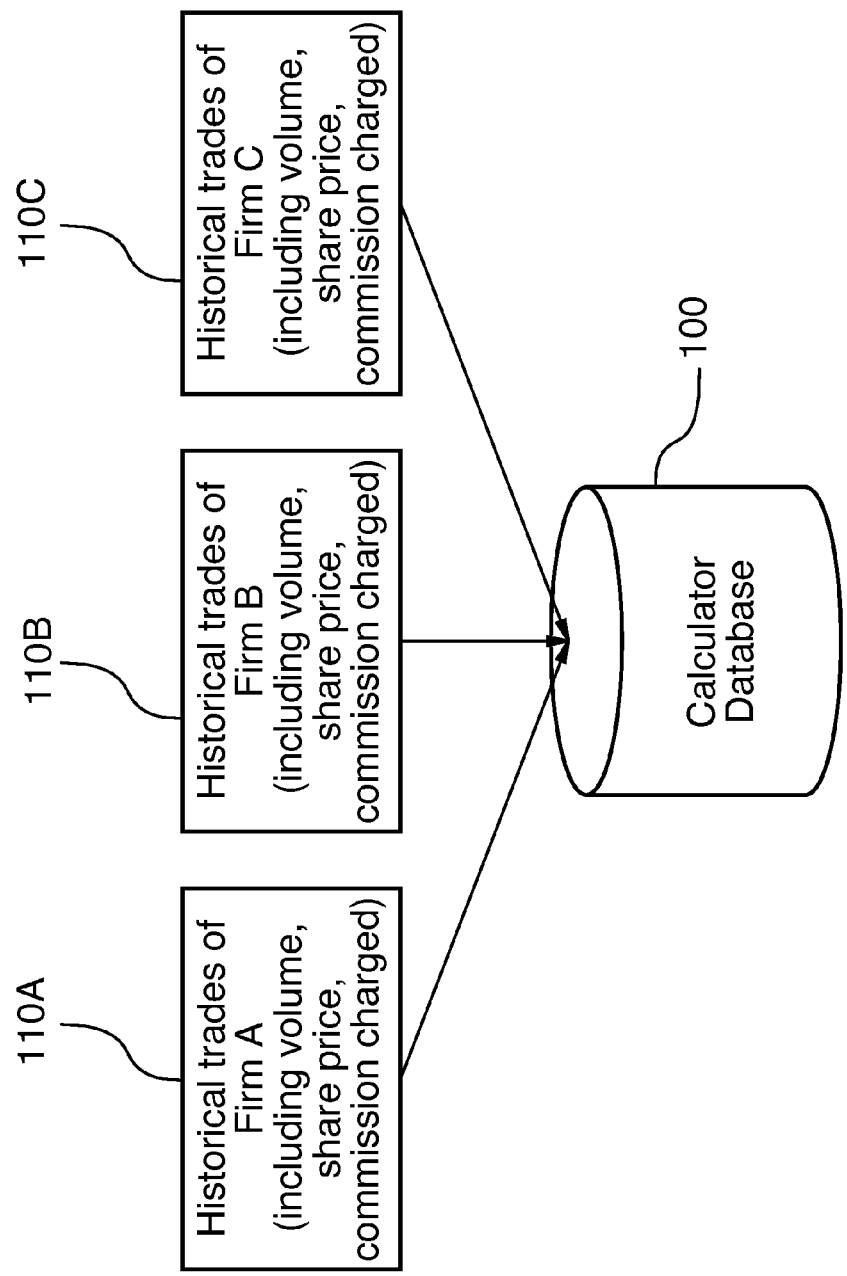
FIG. 1 is a diagram of the data sources of the calculator database.

The calculator database 100 is at the heart of the present application. This database or cluster of databases includes data on historical trades including the number of shares/units or units, the share/unit price, and the commission charged by the other professionals for the trade. Historical trade data from multiple organizations 110A, 110B, 110C is collected and stored together (as illustrated in FIG. 1). In addition to the historical trade data, the system can also access data on firm scheduled (or "list") prices, and other pre-set fee data (e.g. discount brokerage fees or other fixed fee tables).

Figure 6:
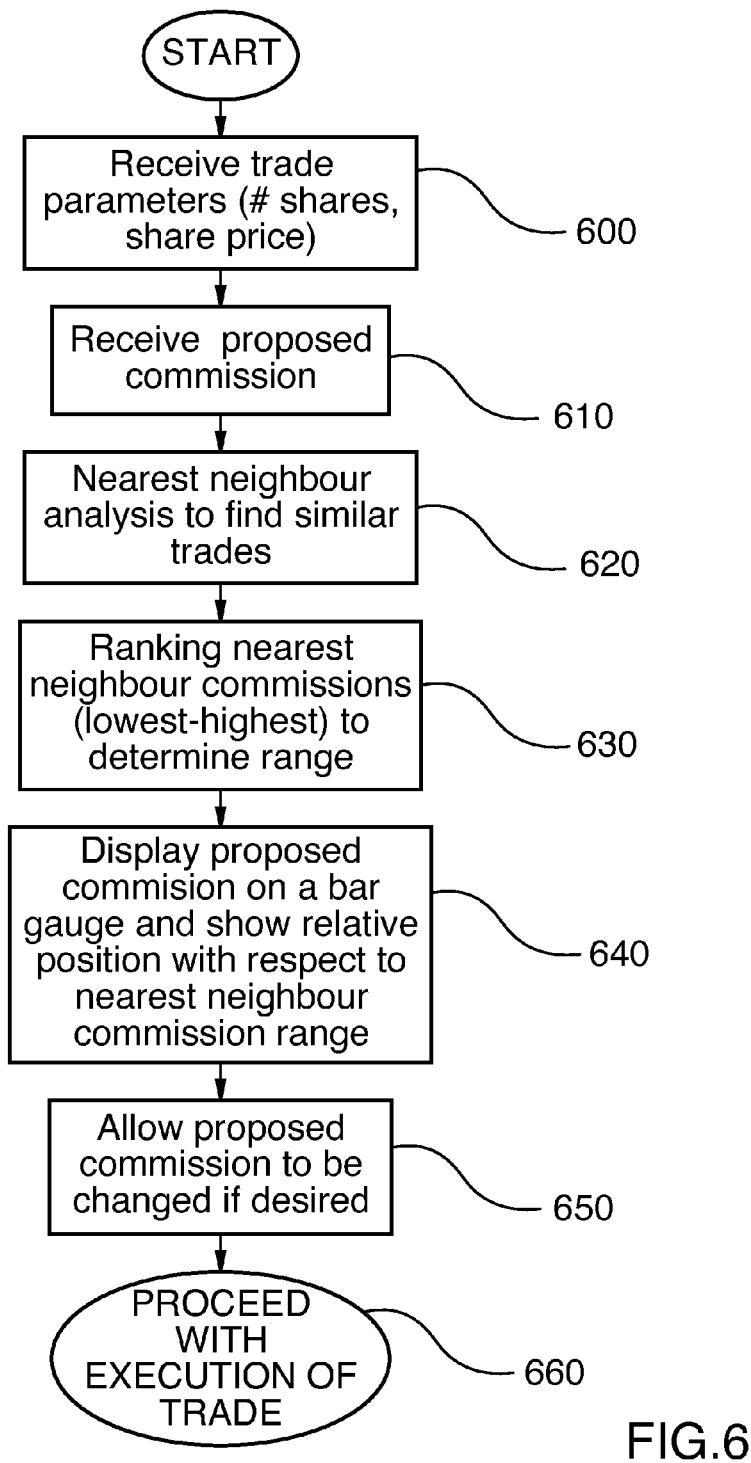
FIG. 6 is a flow diagram of the steps of evaluating a proposed commission for a trade according to a preferred embodiment of the method.

The method is illustrated on a flow chart in FIG. 6. The system receives trade parameters from the professional 600 (including the number of shares/units and share/unit price). Next, the system receives from the professional an input of the proposed commission 610. (This might be automatic—if the professional does not enter a proposed commission, their order entry system often enters the 'list price' or some predetermined commission level on their behalf.) The trade parameters entered at 600 are used in a nearest neighbor analysis 620 to find similar trades by number of shares/units or the overall principal of the trade and the share/unit price. These nearest neighbor transactions are ranked 630 according to the commissions charged for those transactions to determine a range of applicable historical commissions. This commission range is then displayed (preferably, on a bar gauge) and the proposed commission is indicated in its relative position along that range 640. Viewing his proposed commission relative to these historical commissions may cause the professional to want to change his proposed commission. This can be done at step 650. The parameters of the trade and the desired commission are finalized together before executing the trade and charging the commission 660. In this way, the system provides an informed basis on which to price the professional's service for executing the particular trade.

Figure 4A:
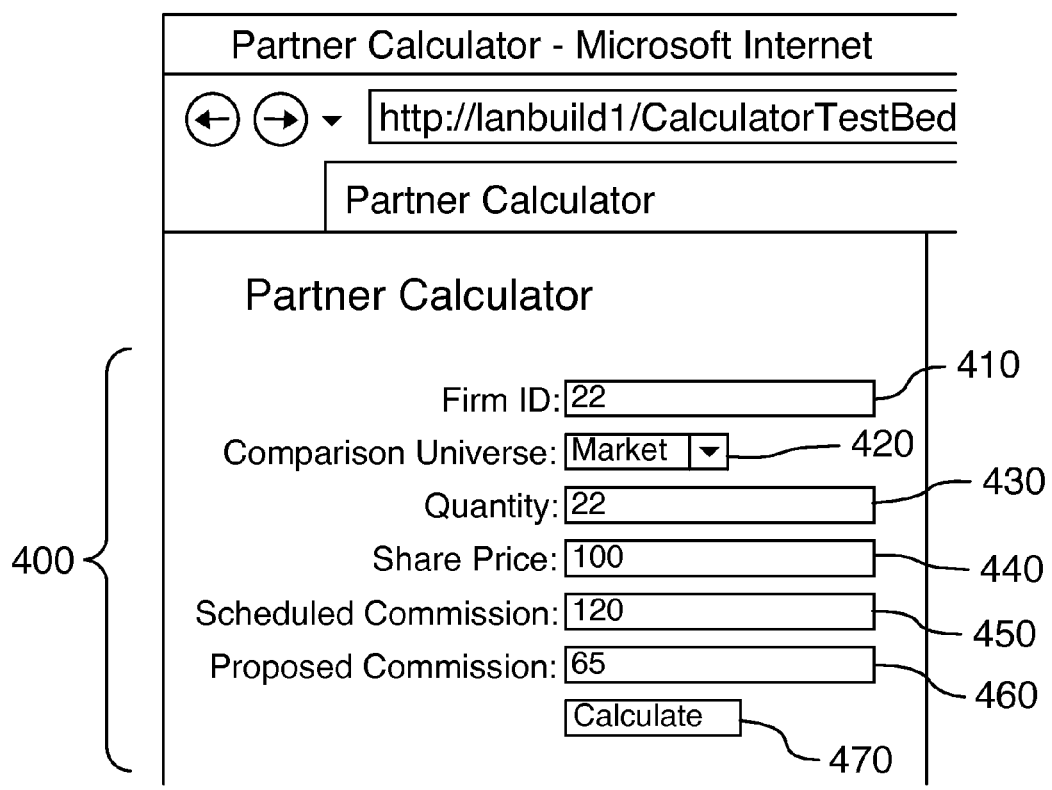
Figure 4C:
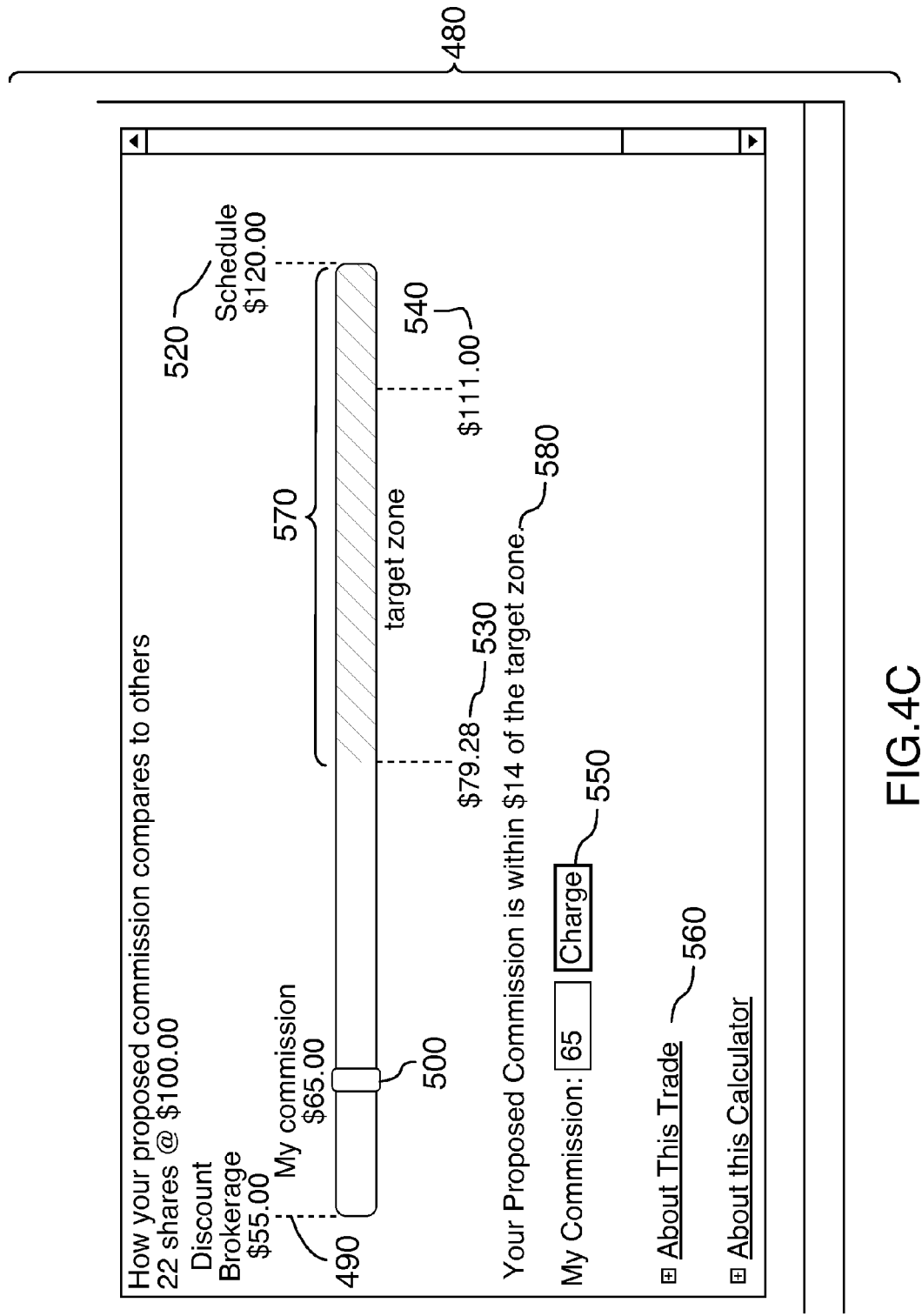

Turning to FIGS. 4A-4C, this process is illustrated with a screen shot showing a sample proposed commission and trade parameter entry. In the upper left corner of the screen shown in FIGS. 4A-4C, the trade parameters and proposed commission are entered in region 400. The firm ID is entered (or pre-populated) 410. A comparison universe is selected at 420. For example, the comparison universe may be the professional's own firm, or the universe of all firms. At 430, the professional enters the quantity of shares/units. At 440, the professional enters the share/unit price. Based on these two parameters, the firm's scheduled commission is retrieved (or calculated) at 450. The professional can enter a proposed commission for the trade at 460. (If none is entered, the system may presume that the scheduled commission is the proposed commission.) Button 470 initiates a "calculator" function, which generates the display in region 480.

Based on the share/unit price and the principal of the transaction (i.e. the quantity multiplied by the share/unit price), a selection of nearest neighbor historical transactions is determined. These are ranked according to their commission. The highest of these historical commissions is noted on the gauge at 540. The lowest may also be illustrated or the bottom of the gauge may simply be the discount brokerage fee for that transaction 490. In this case, the scheduled commission 520 appears as the upper value on the gauge. The scheduled commission may not always appear on the gauge. (The scheduled commission will very often have a lower value than the historical upper limit 540.)

The "target zone" 570 (which may be highlighted in a different contrasting color) represents the range between some pre-selected percentile and the top end of the near neighbor historical transactions (or, as in this case, the scheduled commission, which is higher than the highest near neighbor).

The proposed commission entered by the professional at 460 is shown on the graph as "My Commission" 500. If, as shown here, the "My Commission" amount 500 is below the target zone, the professional can re-enter the proposed commission to an amount within the target zone. Alternatively, the professional can drag the "My Commission" 500 indicator to another spot on the gauge (which may be within the target zone). Dragging the "My Commission" indicator will preferably automatically update the proposed commission field on the left at 460. The target zone provides a visual motivational tool to prompt the professional to price his commission within a historically-realistic upper end of the price spectrum. However, the calculator does not supersede or replace the professional's own discretion. The transaction can still proceed with a commission that is below the target zone.

On the screen, the professional may be advised that his proposed commission is within x dollars of the target zone 580. The final commission can then be entered and charged at 550.

If desired, the professional can also access additional information about the historical trades that the system has analyzed at "About this Trade" 560.

Figure 5:
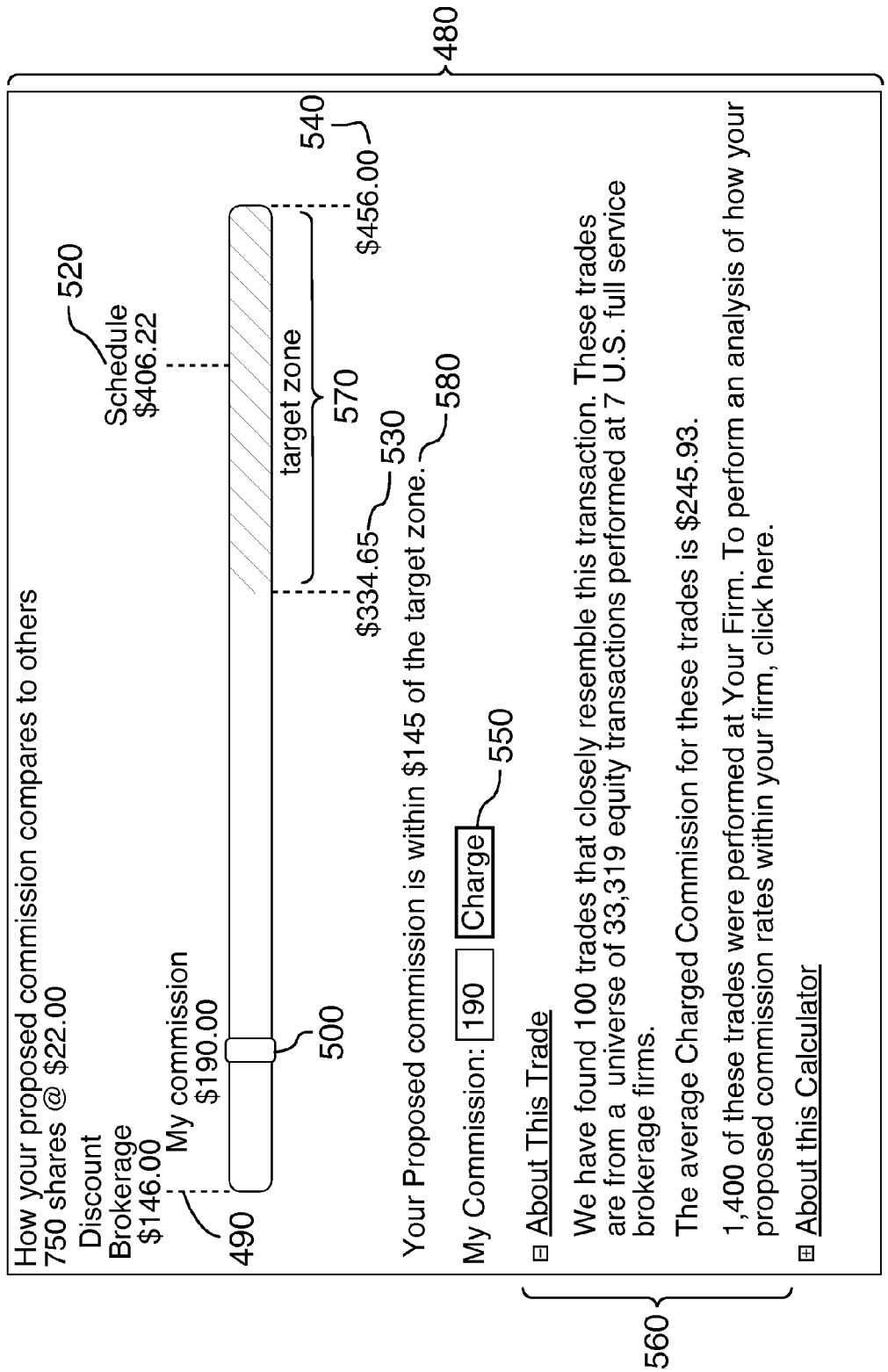
FIG. 5 is a screen shot diagram of the calculator web application showing the display portion only with a second set of sample data.

Turning to FIG. 5, a detailed view of region 480 is shown using a different example. The proposed transaction for 750 shares/units at $22.00 has been analyzed according to 100 nearest neighbor transactions. The upper limit of these historical commissions is $456.00 shown at 540. The discount brokerage fee of $146.00 is shown as the bottom end of the gauge 490. The scheduled fee $406.22 falls within the target zone in this case. In this case, the target zone 570 represents the top third of the historical commissions. The beginning of this percentile is shown at 530 ( 334.65). "My Commission" (entered at $190.00) is shown at 500. This amount can be modified before charging at 550. As shown at 560, the "About this Trade" section can be opened to show specific details about the nearest neighbor transactions. In this case, the trades were from a universe of 33,319 equity transactions performed at 7 US full service brokerage firms. "About this Trade" further specifies that the average charged commission for these trades is $245.93. The section also provides the option to limit the display and analysis to historical commissions only within the professional's own firm.

Figure 3A:
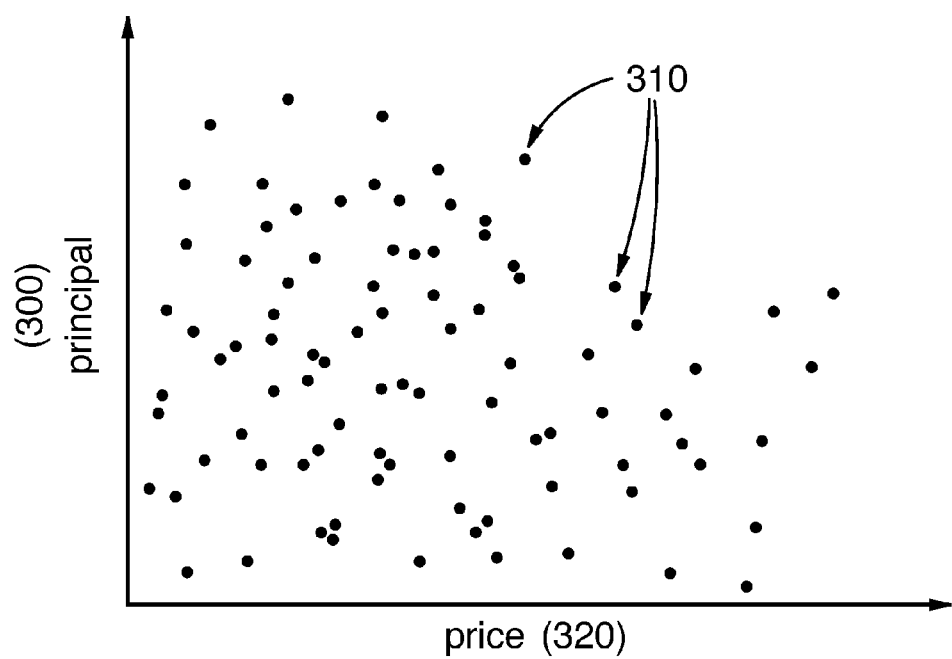
FIG. 3A is a grid of sample historical transactions plotted according to volume and price.

Turning to a more detailed analysis of the nearest neighbor evaluation, FIG. 3A shows a co-ordinate grid having X and Y axes for principal 300 and price 320. Historical transactions 310 are plotted on the grid.

Figure 3B:
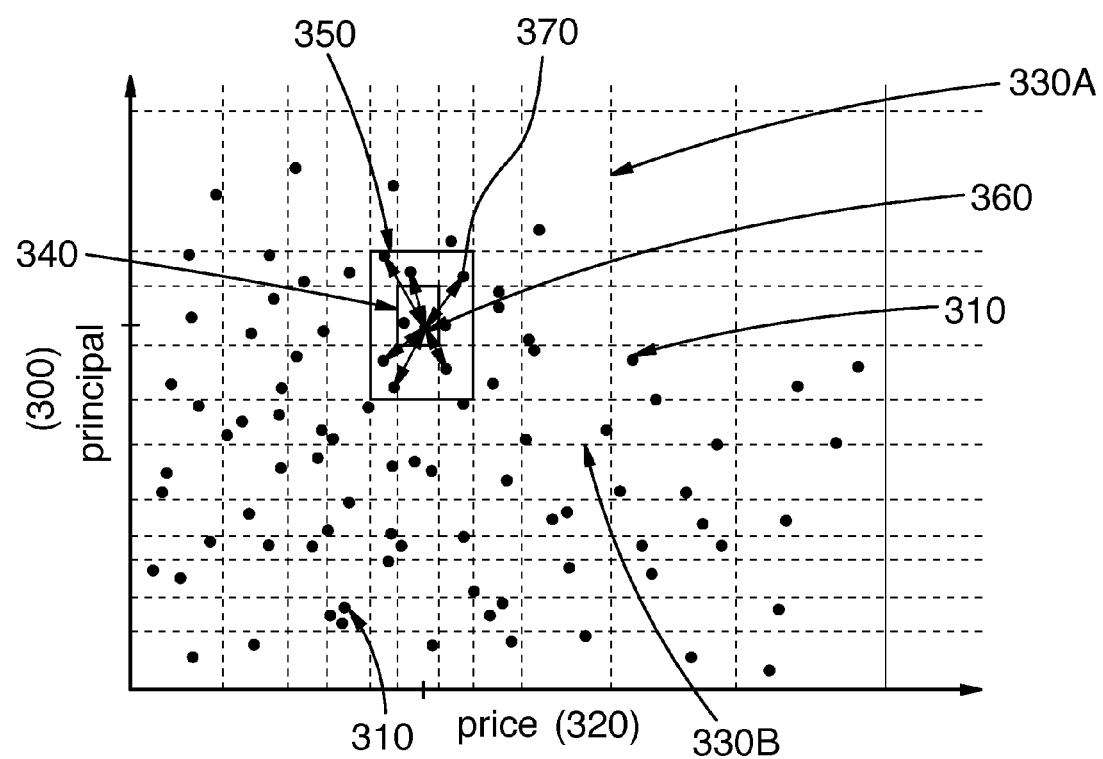
FIG. 3B is a grid of sample historical transactions showing the use of bands for finding nearest neighbors.

Turning to FIG. 3B, a specific target transaction 360 is plotted on the grid and its distance from nearby transactions is evaluated. To avoid the necessity of having to compute the distance between the proposed transaction 360 and every single other transaction in the entire universe of previous transactions, the system has banding on both axes to capture a relatively small number of plotted points within intersecting bands. Looking at a small selection of potential nearest neighbors in band intersection 340, the system checks the Euclidean distance of each point in that predetermined band from the proposed transaction. The system looks to find a specific number N of nearest transactions (e.g. 100 near neighbors). If it does not find a sufficient number of transactions (N) in the predetermined band 340, it looks into a broader band 350, which encompasses the surrounding intersecting bands and moves thus outwardly until the specified number of transactions is met. The distance between points is evaluated according to the following formula:

$$\sqrt{\left(\frac{p_1 - p_2}{p_2}\right)^2 + \left(\frac{sp_1 - sp_2}{sp_2 * pwf}\right)^2}$$

Where:
$p_1$ is the principal of historic trade,
$p_2$ is the principal of the prospective trade,
$sp_1$ is the share/unit price of the historic trade,
$sp_2$ is the share/unit price of the prospective trade, and
pwf is a principal weight factor (a constant that is pre-set by the firm using the calculator system).

If the principal weight factor (pwf) is set as 5 (for purpose of illustration), this means that the method considers trades to be similar with up to five times larger difference of share/unit price than that of principal. In other words, a historic trade will be similar to a prospective future trade when the principals of the two trades are very similar and when the shared prices of the two trades are somewhat similar. The logic behind this pwf is that commission-setting behavior is typically more heavily influenced by the overall principal then the share/unit price of a transaction, although both factors are influential.

The universe may be pre-segmented by currency or country, or another factor defined at the account, household, broker or firm level (e.g. assets, geography, peer group of professionals, etc.).

The foregoing description illustrates only certain preferred embodiments of the invention. The invention is not limited to the foregoing examples. That is a person skilled in the art will appreciate and understand that modifications and variations or will be possible to utilize and carry out the teachings of the invention described herein. Accordingly all suitable modifications, variations and equivalence may be resorted to and such modifications, variations and equivalence are intended to fall within the scope of the invention as described and within the scope of the claims.

What is claimed is:

1. A method of displaying an evaluation tool for evaluating a proposed commission on behalf of a professional at the time of carrying out a transaction, the method comprising:

receiving on a first computer an input of a principal and a share/unit price for a proposed transaction;

receiving on the first computer an input of a proposed commission for the proposed transaction;

using a processor of a second computer in communication with the first computer to identify and rank a plurality of nearest neighbour historical transactions from a historical transactions database stored at the second computer based on the principal and the share/unit price of the proposed transaction, each historical transaction being associated with a historical commission, and finding the highest and lowest historical commissions among the plurality of nearest neighbour historical transactions;

generating a display graph on the first computer wherein the range of nearest neighbour historical transactions are shown on the graph from lowest to highest;

displaying the proposed commission on the graph to allow the professional to evaluate the proposed commission relative to the nearest neighbor historical commissions; and allowing the proposed commission to be changed by input on the first computer before the proposed transaction is finalized or executed.

2. The method of claim 1, wherein the display graph further includes an indication of a top percentile of the range of commissions.

3. The method of claim 2, further comprising, if the proposed commission is below the top percentile, calculating and displaying the difference between the top percentile and the proposed commission.

4. The method of claim 1, further comprising calculating a scheduled commission based on the principal and share/unit price of the proposed transaction, and displaying the scheduled commission on the graph.

5. The method of claim 4, further comprising, if the proposed commission is below the scheduled commission, calculating and displaying the difference between the scheduled commission and the proposed commission.

6. The method of claim 1, further comprising calculating or retrieving a fixed low value commission based on the principal and share/unit price of the proposed transaction, and displaying the fixed low value commission on the graph.

7. The method of claim 1, further comprising, displaying an alert if the proposed commission is below the fixed low value commission.

8. The method of claim 1, wherein the graph is formatted as a bar gauge.

9. The method of claim 1, wherein the graph is formatted as a dial gauge.

10. The method of claim 2, wherein the top percentile is displayed in a different color from the remainder of the graph.

11. The method of claim 1, wherein the identifying step further comprises:

plotting the historical transactions on a grid having axes for principal and share/unit price;

plotting the proposed transaction on the grid based on its principal and share/unit price;

picking selected historical transactions from the grid and calculating the Euclidean distance from the proposed transaction to the historical transactions; and selecting a subset of the historical transactions having the smallest Euclidean distance as the nearest neighbor historical transactions.

12. The method of claim 11, wherein the subset has a preselected number of nearest neighbor historical transactions.

13. The method of claim 1, wherein the historical transactions database comprises historical transactions from a single firm.

14. The method of claim 1, wherein the historical transactions database comprises historical transactions from a plurality of firms.

15. The method of claim 1, wherein the historical transactions database is pre-segmented to consider transactions only within the same currency.

16. The method of claim 1, wherein the historical transactions database is pre-segmented to consider transactions only within a predetermined time period.

17. The method of claim 1, wherein the historical transactions database is pre-segmented to consider transactions only within a particular asset class or type of transaction or type of account.

18. The method of claim 11, wherein the picking step further comprises choosing historical transactions from stepwise bands of transactions near the proposed transaction.

19. The method of claim 6, wherein the fixed low value commission is displayed as a bottom end of the graph.

20. The method of claim 19, wherein the fixed low value commission represents a discount brokerage fixed rate.

21. The method of claim 1, wherein the proposed commission can be changed by dragging an indicator representing the proposed commission on the graph.

22. The method of claim 1, wherein the method further comprises pre-populating an order entry form with the commission once finalized.

* * * * *